US008707460B2

(12) United States Patent
Cabouli

(10) Patent No.: US 8,707,460 B2
(45) Date of Patent: Apr. 22, 2014

(54) SMART WALLET

(76) Inventor: Steven D. Cabouli, San Diego, CA (US)

( * ) Notice: Subject to any disclaimer, the term of this patent is extended or adjusted under 35 U.S.C. 154(b) by 1377 days.

(21) Appl. No.: 12/125,003

(22) Filed: May 21, 2008

(65) Prior Publication Data

US 2009/0077675 A1  Mar. 19, 2009

Related U.S. Application Data

(60) Provisional application No. 60/972,608, filed on Sep. 14, 2007.

(51) Int. Cl.
*H04L 29/06* (2006.01)

(52) U.S. Cl.
USPC ....... 726/34; 726/9; 726/20; 726/21; 713/172

(58) Field of Classification Search
CPC ................................ G06F 21/86; G06F 21/34
USPC .............................................. 713/172; 726/34
See application file for complete search history.

(56) References Cited

U.S. PATENT DOCUMENTS

| 4,780,704 | A | * | 10/1988 | Tommasini | ................ 340/568.7 |
| 5,653,276 | A | | 8/1997 | Niernberger | |
| 5,841,122 | A | * | 11/1998 | Kirchhoff | ..................... 235/492 |
| 5,912,619 | A | * | 6/1999 | Vogt | ........................... 340/545.1 |
| 6,260,300 | B1 | * | 7/2001 | Klebes et al. | ................ 42/70.11 |
| 6,703,599 | B1 | * | 3/2004 | Casebolt et al. | .............. 250/221 |
| 2004/0203895 | A1 | * | 10/2004 | Balasuriya | ................. 455/456.1 |
| 2004/0238625 | A1 | * | 12/2004 | Walker et al. | ................. 235/380 |
| 2006/0261174 | A1 | | 11/2006 | Zellner et al. | |
| 2006/0273129 | A1 | | 12/2006 | Horn | |
| 2008/0291004 | A1 | * | 11/2008 | Regan et al. | .................. 340/505 |
| 2009/0045958 | A1 | * | 2/2009 | Spano | ........................ 340/572.2 |

FOREIGN PATENT DOCUMENTS

| KR | 2006-106248 | 10/2006 |
| KR | 2007-045407 | 5/2007 |

* cited by examiner

*Primary Examiner* — Mohammad L Rahman
(74) *Attorney, Agent, or Firm* — The Law Office of Michael E. Kondoudis

(57) ABSTRACT

A smart wallet that can only be exclusively opened by an authorized individual through biometric authentication is disclosed. The smart wallet also has a security system associated therewith to prevent the smart wallet from being lost or stolen. The system comprises a fob key configured to send periodic wireless transmissions to the smart wallet device having the ability for approximate range detection. Various embodiments include audible, visual and vibrational indications for authentication, battery power and range detection.

11 Claims, 5 Drawing Sheets

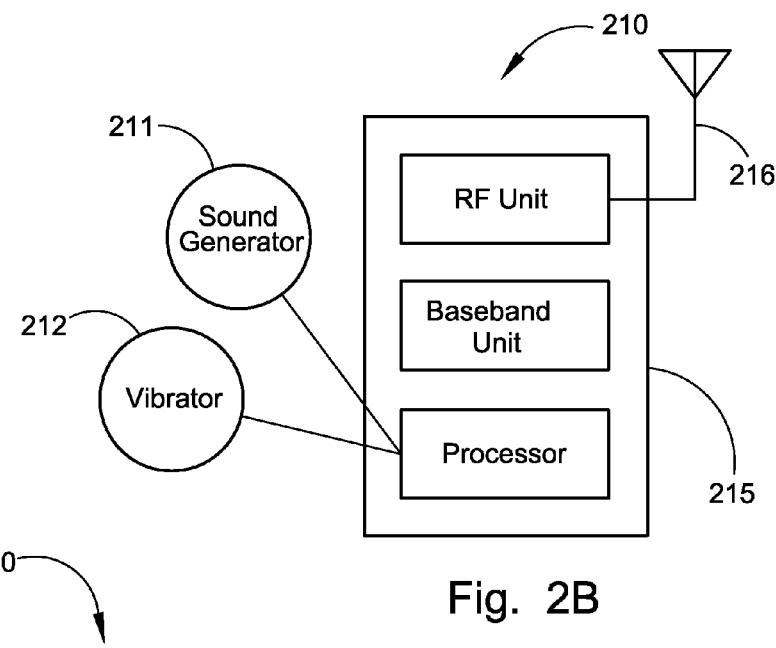
Fig. 2B
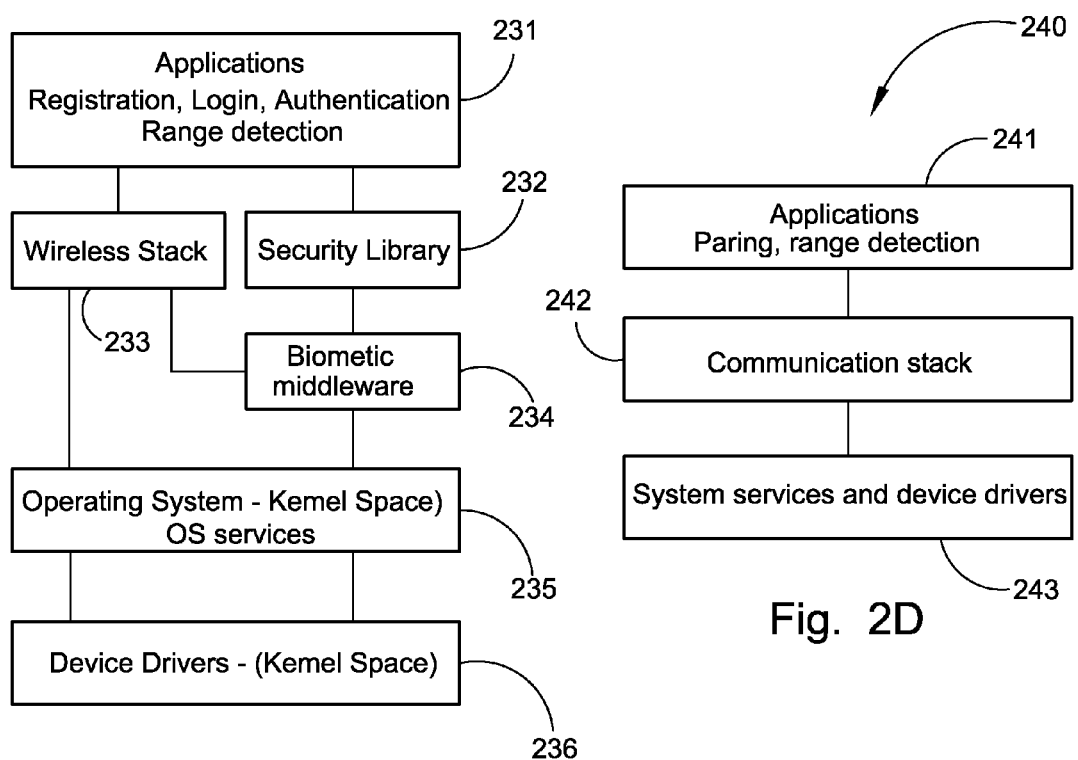
Fig. 2C
Fig. 2D

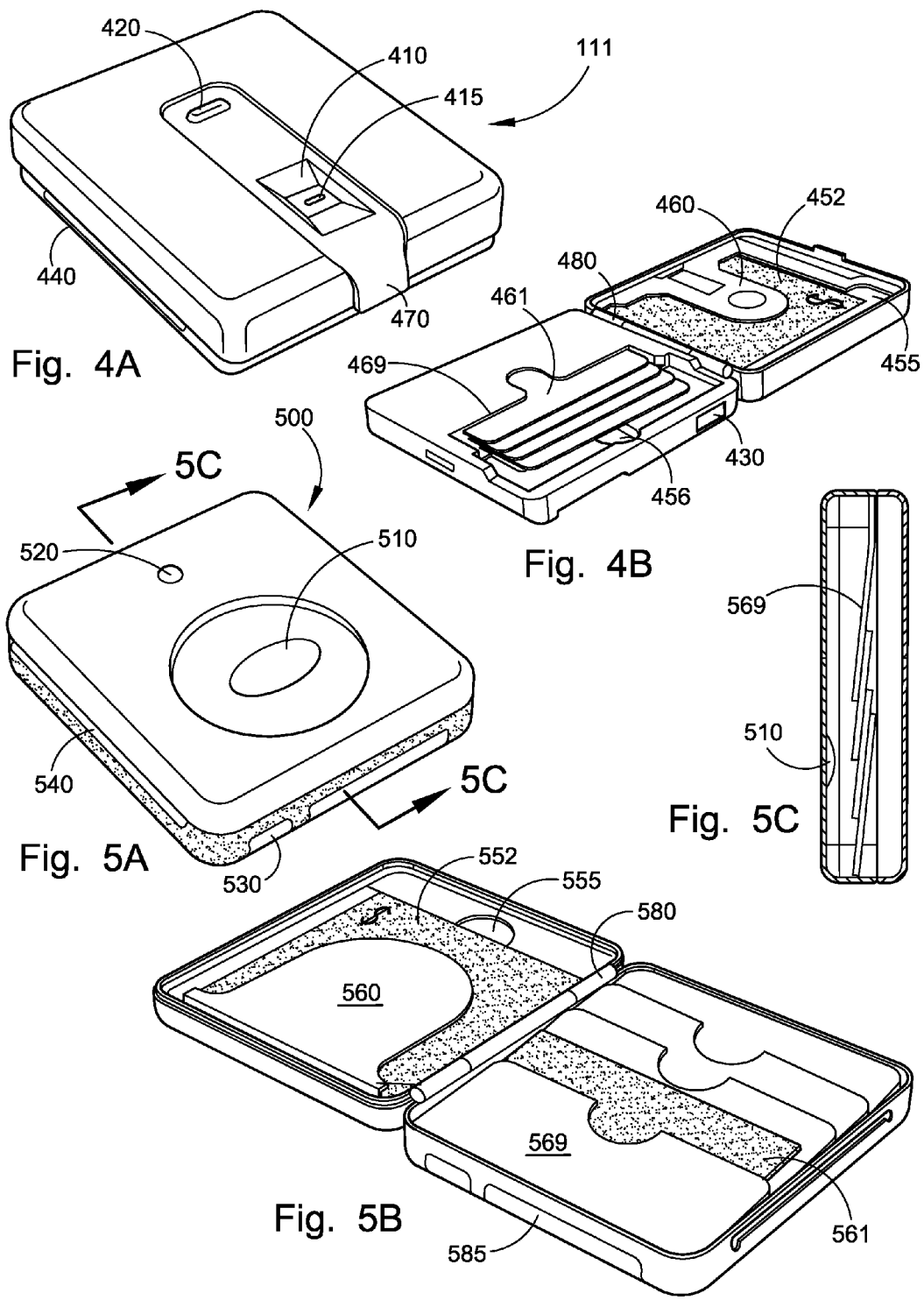

SMART WALLET

PRIORITY CLAIM

This patent application contains subject matter claiming benefit of the priority date of U.S. Provisional Patent Application Ser. No. 60/972,608 filed on Sep. 14, 2007, accordingly, the entire contents of this provisional patent application is hereby expressly incorporated by reference.

BACKGROUND OF THE INVENTION

1. Field of the Invention

The present invention pertains generally to wallets or billfolds with improved security features. More specifically, the present invention pertains to systems and methods for securing wallets while employing electronic features. The present invention is particularly, but not exclusively, useful as a smart wallet system and method with advanced features including biometric authentication and an ability to transmit and receive electronic signals.

2. Description of the Prior Art

In an age where electronic devices and transactions are prevalent, safe-guarding data has become an important issue, thus giving rise to a myriad of security systems. Two of the common security systems used are password and personal identification (PIN) systems. Password systems require a user to provide the authentication system with a username and a password (both of which are unique to the user). PIN systems on the other hand usually require a user to provide a code, usually referred to as the PIN code, for authentication purposes. Both the password and the PIN system can prove to be a nuisance to users in the event they forget their password or PIN code. Moreover, a user A can easily impersonate another user B if user A happens to get a hold of the password or PIN code (given either voluntarily or exploited through other means) of user B. One way to avoid such breaches of security is to implement a user-based physiological or behavioral characteristic as a means for authentication. This is the general idea behind biometrics.

Biometrics is the study of measurable biological characteristics. In computer security, biometrics refers to authentication techniques that rely on measurable physiological (e.g. face, fingerprint, hand, iris, or DNA) or behavioral (e.g. keystrokes, signature, or voice) characteristics that can be automatically checked.

In the above description, authentication is usually accomplished via a biometric device. A general description of the functionality of a biometric device now follows. First, the biometric device captures a profile of the characteristic and next, a comparison of the acquired profile is made with a stored profile or template. Lastly, upon successful matching of the captured and stored profile, the user is interfaced with the application system requesting authentication.

Authentication based on fingerprint: One of the most common biometric techniques is the fingerprint, wherein users scan in a copy of their fingerprint and a comparison is performed by the authentication device as to whether or not the input fingerprint matches that of a stored fingerprint corresponding to the same person. Some fingerprint authentication devices further provide a step of checking for a pulse to combat problems posed by false-authentication via fingerprints that are not real.

Authentication based on hand geometry: An authentication querying system captures the physical characteristics of a user's hand and fingers via a scanner and is matched with a stored template of the same user. Upon successful authentication, an action (like opening a secure door) is performed by the querying system.

Authentication based on retinal scanning: A scanner scans at close range a user's retina (the image forming innermost coat of the black part of the eye ball) using a low intensity light, creating an eye signature. The image is further matched to a stored retinal template, and a specific action is performed upon successful authentication. It should however be noted that failure of a user to focus correctly may provide an inaccurate result.

Authentication based on iris scanning: An iris scanner scans unique random patterns of the iris (the colored part of the eye) and authenticates users based on comparing the consistency of the acquired pattern with that of stored patterns. Unlike retinal scanning, close range interaction is not required.

Authentication based on facial recognition: A facial recognition system scans (the features of a users face) and captures an image of the user's face and compares it to a stored static facial image of the same user. Upon successful authentication, a specific action is performed by the facial recognition system.

Authentication based on signature verification: This authentication technique utilizes a pressure sensitive pen and a tablet to record a user's signature. The system then compares it against stored samples of signatures corresponding to the same user, and upon authentication, performs a specific action.

Authentication based on voice recognition: Authentication in this technique is based on recognizing voice and speech characteristics (associated with a user) that are imperceptible and hence not replicable. Voice recognition systems typically require more memory for storing voice templates of users.

Therefore, biometrics are beginning to play a critical role in authentication and security. Biometrics authenticate the user not based on what he can remember (like passwords, PIN's, etc.), but rather use the user's characteristics (or who the user is) to perform authentication.

Wallets heretofore, have also been known. Some examples include U.S. Pat. No. 5,653,276, entitled COMBINATION WALLET AND BILLFOLD, to Niernberger; and U.S. Pat. App. Pub. No. 2006/0273129, entitled WALLET SECURITY, to Horn.

Also recently, improvements in electronic tracking and inventory systems have been proposed that take advantage of the latest short range, low power technologies such as Bluetooth and ZigBee. However, no similar proposals have been made that specifically address a person's wallet providing biometric authentication and electronic tracking.

In light of the above, it is an object of the present invention to provide a Smart Wallet, or an iWallet, that proposes a biometric based authentication module to prevent a non-owner from accessing the device. It is further an object of the present invention to provide a secure wallet that is tamper resistant and water resistant. It is still further an object of the present invention to provide a smart wallet with electronic transmission and receiving capability to provide, for example indication when a secure wallet and a corresponding fob key are taken out of a preselected range. It is yet still further an object of the present invention to provide either a fob key device configured to fit onto or into a cellular telephone device, or alternatively configured to a key chain. It is an additional object of the present invention to provide a secure wallet with a USB port so that data can be retrieved, stored and programmed to the device via a personal or laptop computer. It is still another object of the present invention to provide a Smart Wallet system and method that is simple to use, yet easy to implement and comparatively cost effective.

BRIEF SUMMARY OF THE INVENTION

The present invention specifically addresses and alleviates the above mentioned deficiencies, more specifically, the present invention is directed to a smart wallet comprising: an open position; a secure position; and a biometric reader wherein the biometric reader provides biometric authentication allowing the wallet to transition from the secure position to the open position.

The smart wallet, in a first aspect, is further characterized as having a left-hand side; and a right-hand side, the left and right-hand sides connected by hinges. A preferred embodiment also has an LED indicating a relative battery strength. Additionally, the smart wallet comprises a plastic support clip on an interior of the wallet, the plastic support clip configured to receive personal business cards.

The smart wallet is also a part of a smart wallet tracking system. For this, the smart wallet comprises a first RF unit; and the tracking system further includes a fob comprising a separate a second RF unit, the first and second RF units configured to send and receive electronic transmissions from each of said units, the fob providing audible indication when the fob and smart wallet are separated by a predetermined range.

Yet another physical feature of the smart wallet is that an interior portion of the wallet includes a base relief to facilitate extraction of bills and credit cards. Also, the interior portion includes a card holder for storage of business cards or credit cards and the card holder includes an angular offset to facilitate extraction of said cards. It is further contemplated that the smart wallet comprises polycarbonate-ABS blend; and styrene-acrylonitrile material.

In a second aspect, the present invention is a method of securing a wallet, the method comprising: providing a wallet having electronic transmitting and receiving capability; providing a fob key transmitting and receiving electronic signals from the wallet; determining whether the wallet is within a predetermined distance from the fob key using the transmitting and receiving electronic signals; and indicating audibly if the fob key and the wallet are detected as being beyond the predetermined distance.

The method herein additionally comprises latching the wallet in a closed position; controlling the latching electronically via control signals; and authenticating the controlling the latching biometrically.

In a third aspect, the present invention is a system for securing a wallet comprising: a fob key maintained separately from the wallet, wherein the wallet and fob key are able to transmit and receive electronic signals with one another and wherein an approximate distance can be determined between the wallet and the fob key; and audible indication to alert a user when the approximate distance exceeds a predetermined distance.

The system of the present invention additionally characterized in that the wallet further comprises an open position; a secure position; and a biometric reader wherein the biometric reader provides biometric authentication allowing the wallet to transition from the secure position to the open position.

The fob key of the present invention comprises a battery compartment, the battery compartment including a screw type lid. Additionally, self-adhesive is provided for affixing the fob to a cellular phone. As an alternative, all hardware components of a fob key of the present invention are incorporated into a cellular phone design. In yet another alternative, the fob further comprises a loop for attaching to a key chain.

While the apparatus and method has or will be described for the sake of grammatical fluidity with functional explanations, it is to be expressly understood that the claims, unless expressly formulated under 35 USC 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2B illustrates a block diagram for hardware components for a fob key of the present invention;

FIG. 2C illustrates a block diagram for software components for a smart wallet of the present invention;

FIG. 2D illustrates a block diagram for software components for a smart wallet of the present invention;

FIG. 4A is a perspective illustration of a second smart wallet embodiment in a closed (secure) position;

FIG. 4B is a perspective view of the second smart wallet embodiment in an open position;

FIG. 5A is a perspective illustration of a third smart wallet embodiment of the present invention in a closed position;

FIG. 5B is a perspective illustration of the third smart wallet embodiment of the present invention in an open position;

FIG. 5C is a cross-sectional illustration of the third smart wallet embodiment along sectional line 5C-5C in FIG. 5A;

DETAILED DESCRIPTION OF THE PREFERRED EMBODIMENTS

Figure 1:
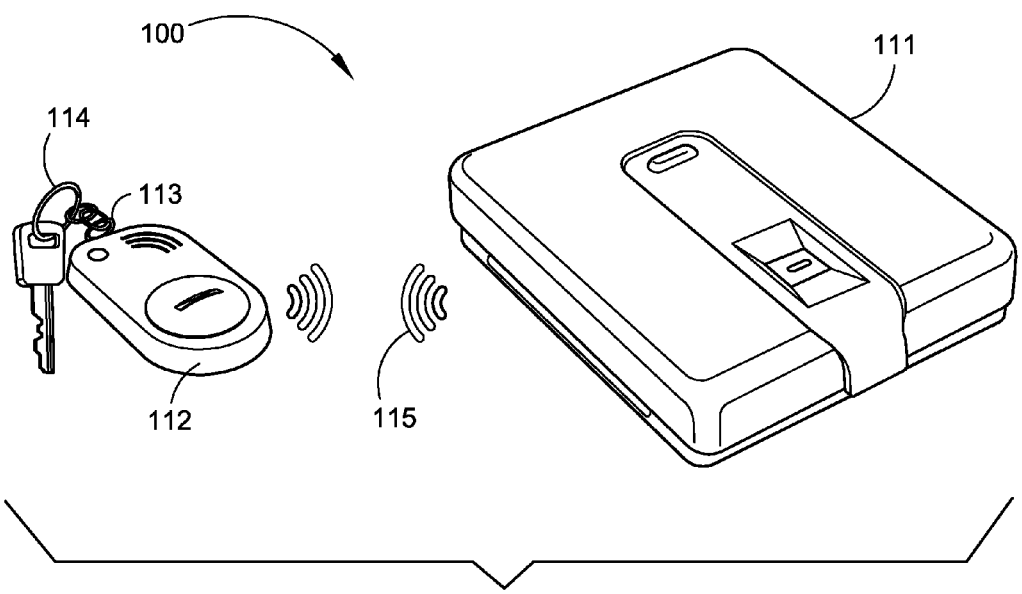
FIG. 1 is a schematical illustration of a system for securing a wallet of the present invention.

Referring initially to FIG. 1, a smart wallet tracking system 100 is illustrated. First, a smart wallet 111 is provided having relatively low power, relatively short range, wireless transmission 115 capability. Second, an electronic fob 112 is provided also having wireless transmission capability configured to transmit and receive signals from the smart wallet 111. As an example, the fob key can be mated to a key chain 114 via loop 113, or alternatively, the fob key 112 could also be configured into or onto a cell phone 690 as illustrated in FIGS. 6A through 7C, for example.

System 100 is still further configured so that when wallet 111 and fob 112 are separated by a predetermined distance, for example ten (10) feet, the system 100 will provide audio and/or vibrational indication to both the wallet 111 and the fob 112. The audio indication could be provided, for example, by a sound generator 201, 211, such as a buzzer or a speaker. Further, the vibrational indication could be provided by, for example, a miniature motor configured with a weight imbalance to cause vibration. The audio indication principle purpose is to alert an owner when the wallet 111 has been stolen, and further, the direction the wallet relative to the owner in the moments after a suspected theft.

As another alternative, fob 112 is configured with wireless transmission ability while the wallet itself includes only passive RFID; and therefore only the fob key 112 would alert a user when the wallet 111 goes out of range. In a preferred embodiment, the wallet 111 and fob key 112 range determination is achieved approximately by a relative signal strength detected by a receiver from either or both of the fob key 112 and the wallet 111.

Figure 2A:
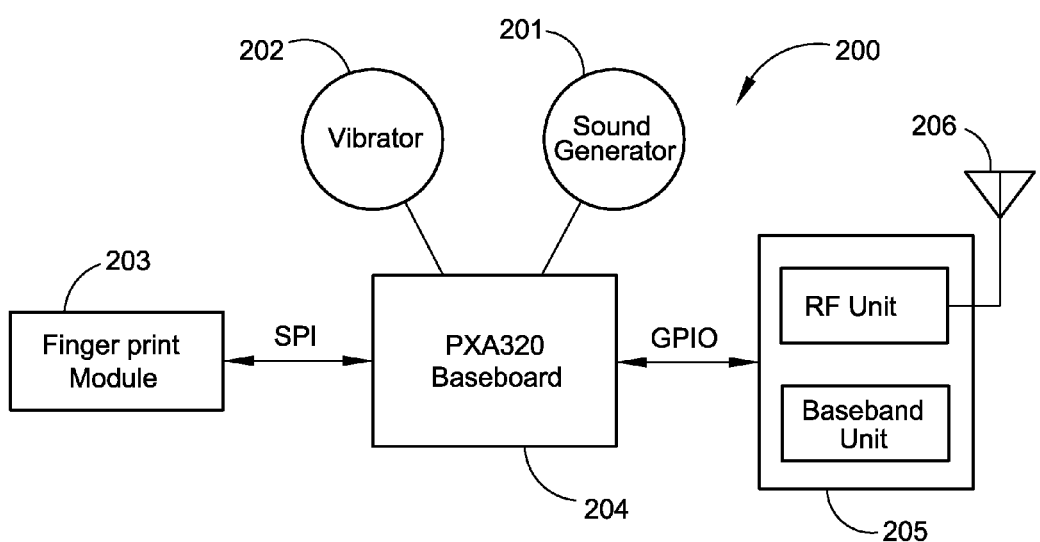
FIG. 2A illustrates a block diagram for hardware components for a smart wallet of the present invention.

Referring to FIG. 2A, a block diagram 200 of exemplary hardware components is shown. In a preferred embodiment, a biometric reader is realized as fingerprint module 203. Microprocessor 204 controls the actions of the range detection, for example with sound generator 201 and vibrator 202, and also with authentication of the user via the fingerprint module 203. A Security Parameter Index (SPI) is associated with a wallet owner's biometric signature. Microprocessor 204 communicates to wireless module 205 via a General Purpose Input/Output (GPIO), for example, and includes antenna 206. It is preferred that both processor 204 and wireless module 205 are low power consuming and concurrent with the latest advancements in such electronics. Further, wireless module 205 is configured, according to for example, short range low power protocols as defined by either Bluetooth, ZigBee (IEEE 802.15.4), Radio Frequency Identification (RFID), or Ultra-Wideband (UWB).

FIG. 2B illustrates a fob key hardware block diagram 210 wherein a microprocessor 215 is integrated with a wireless module. Similarly, the integrated processor and wireless module 215 control sound generator 211 and vibrator 212, and is electronically connected to antenna 216.

FIG. 2C shows software block diagram 230 for the smart wallet 111 of the present invention. It 230 comprises applications including registration, login, authentication, range detection 231, wireless stack 233, security library 232, biometric middleware 234, operating system 235, and device drivers 236. The operating system 235 includes all the services such as interprocess communications, memory management, clock, and file system. Device drivers 236 include wireless, flash, I/O ports, timers, fingerprint reader, and others. Sitting on top of the OS 235 are the wireless communication stack 233, biometric library (middleware) 234, and security library 232. The application layer 231 includes applications such as sync, user registration, user authentication, and range detection, for example.

FIG. 2D illustrates software block diagram 240 for the fob key 112 of the present invention. It 240 comprises applications including pairing and range detection 241, communications stack 242, system services and device drivers 243. Software on the electronic fob key 112 is simpler than software on the smart wallet 111. According, no full featured operating system is provided but instead a simple round-robin loop, where each software module 241 242, 243 is given a time slice of a CPU.

Figure 3A:
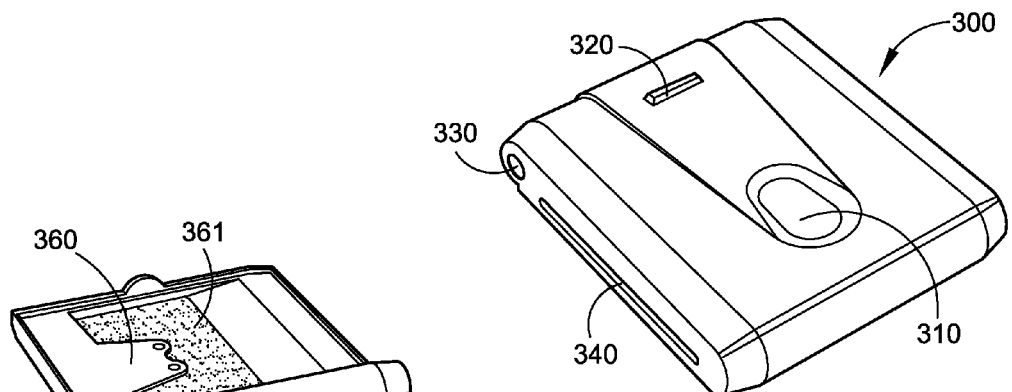
FIG. 3A is a perspective illustration of a first smart wallet embodiment, also known as an iWallet, of the present invention.

Another embodiment 300 of a smart wallet is illustrated in FIG. 3A in a closed or secure position. As shown, biometric reader 310 is configured to scan a fingerprint of a person attempting to access the wallet 300. LED 320 is designed to emit green when processor 204 recognizes the fingerprint as the owner of smart wallet 300. Also, a chime is emitted from sound generator 201 when a successful authentication is received. Additionally, LED 320 is designed to emit red light, and sound generator 201 will emit a warning buzzer, when the biometric reader 310 scans a fingerprint other than what the processor 204 recognizes as the owner. Still further, LED 32 is designed to emit amber light when battery power for the wallet 300 is below a threshold level and also sound generator 201 will emit an intermittent beeping sound. In a preferred embodiment, recharging of wallet battery power can be achieved via mini USB port 330 to a charger that plugs into an AC power supply. Alternatively, a separate port for an AC adapter can be provided as a design choice.

Wallet 300 may be described as similar a cigarette case that is tamper resistant and opens up only biometrically, for example by fingerprint. Wallet 300 can only be opened by the owner himself; and therefore, children, a spouse, roommates, etc. are denied access to contents thereof while the owner of the wallet is for instance sleeping, or in the bathroom.

Figure 3B:
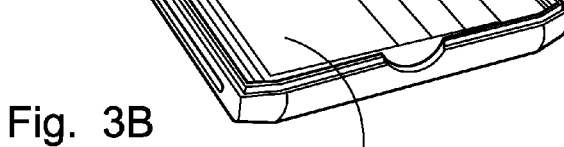
FIG. 3B is a perspective illustration of the first smart wallet embodiment in an open position.
Figure 3C:
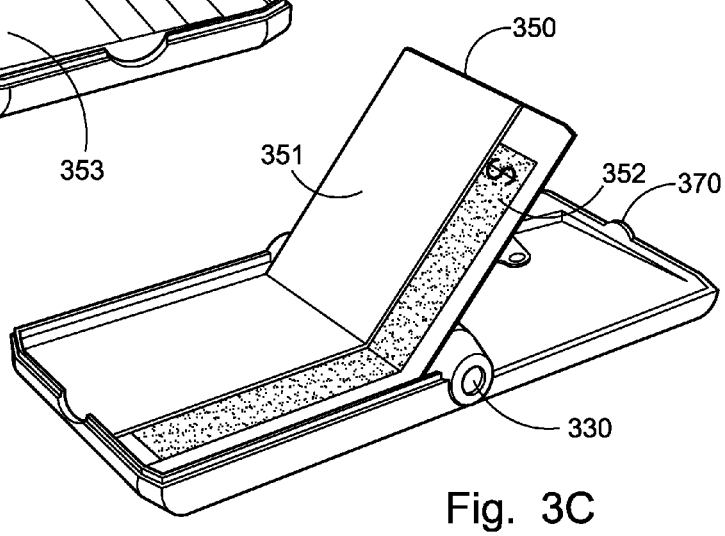
FIG. 3C is a perspective illustration of the first smart wallet embodiment having an interior leather compartment in an unfolded position.
Figure 3D:
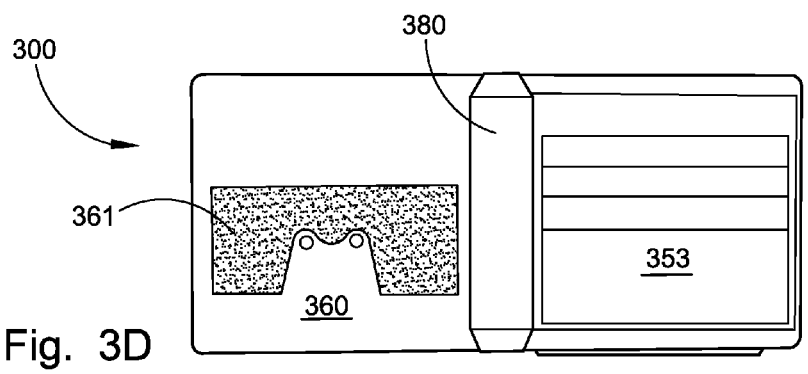
FIG. 3D is a top plan view of the first smart wallet embodiment of the present invention.

FIG. 3A also shows antenna 340 and mini USB port 330. FIGS. 3B through 3D further illustrate wallet 300 in various views. Wallet 300 in an open position is shown in FIG. 3B. An interior of the smart wallet 300 presents on its left side a plastic support clip 360 where one can put for instance, personal business cards 361. On an opposing right side, a leather compartment is provided with inner 351 and outer sections 353. Inner section 351 is designed to receive paper money 352 as shown in FIG. 3C. Outer section 353 is designed to receive credit cards, or similar items as shown in FIGS. 3B and 3D. Also illustrated is a latch 370 used to secure wallet 300. In a preferred embodiment, latch 370 is controlled by a motor actuator; however other type actuators may be employed. Whatever choice of actuator, it is designed to de-energize shut, therefore, smart wallet 300 locking mechanism defaults into locked state when power is lost or in standby mode. In a preferred embodiment, battery power is minimized because latch control power is only applied to unlatch.

FIGS. 4A and 4B further illustrate a smart wallet embodiment 111 as originally shown in FIG. 1. Here, an alternative latch 470 embodiment has been illustrated. Also, this embodiment 111 differs from the smart wallet 300 shown in FIG. 3A in that two LEDs 415, 420 are provided. A first LED 420 can be dedicated to battery power indication and a second LED 415 provides indication of biometric access. Other physical features to note are antenna 440 and USB port 430. Also to note, card holder 469 for receiving cards 461 and plastic clip 460 for retaining paper money 452. Importantly, this embodiment 111 includes base relief 455 to assist in extraction of bills 452; as well as base relief 456 to assist in the extraction of cards at an interior portion of wallet 111. Further, the interior of the wallet 111 is exposed about hinges 480.

Yet further, another embodiment 500 of a smart wallet according to the present invention is shown in FIGS. 5A through 5C. Similarly, it 500 comprises LED 520, USB port 530 and antenna 540 joining biometric reader 510. Also similarly, an interior portion of wallet 500 includes clip 560 for securing paper money 552 having base relief 555 to facilitate extraction thereof. The interior portions are formed about hinges 580. However, this embodiment 500 is unique in that card holder 569 retains cards 561 at a slight tilt as illustrated in FIGS. 5B and 5C.

Figure 6A:
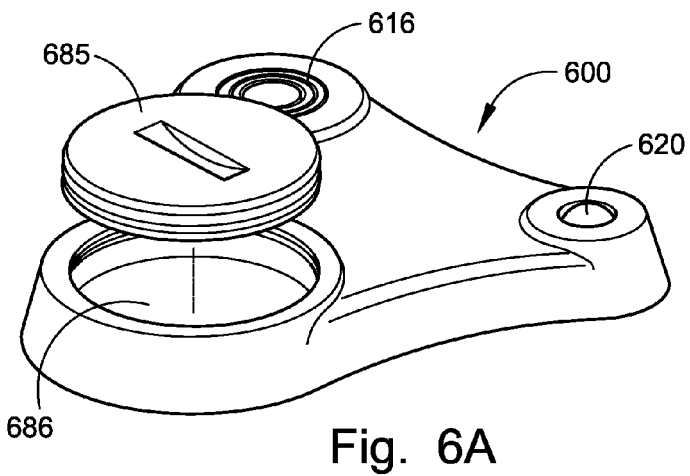
FIG. 6A is a perspective illustration of a first fob key embodiment of the present invention.
Figure 6B:
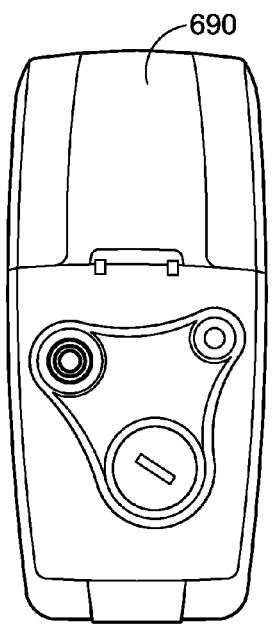
FIG. 6B is a side view of the first fob key embodiment affixed to a cellular phone according to a preferred embodiment of the present invention.
Figure 7A:
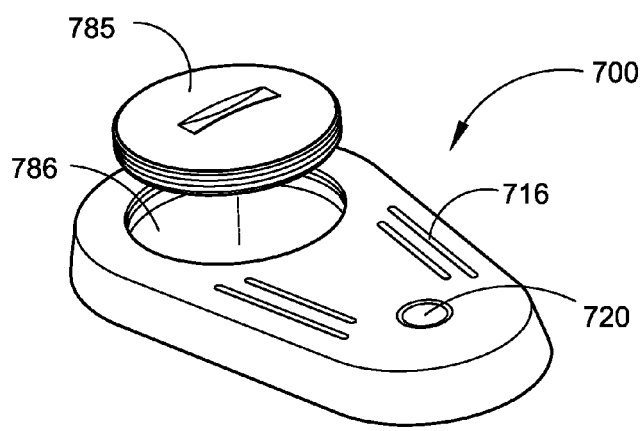
FIG. 7A is a perspective illustration of a second fob key embodiment of the present invention.
Figure 7C:
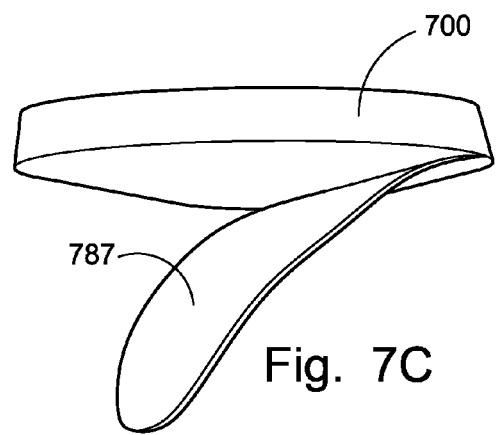
FIG. 7C is a perspective view of the second fob key embodiment from underneath the device illustrating the self-adhesive of the present invention.

FIGS. 6A and 6B illustrate yet another embodiment 600 for a fob key of the present invention, however, this solution pairs the fob 600 to a cellular telephone 690 via a suitable adhesive 787 (FIG. 7C). Fob 600, has a speaker 616, an LED 620 and also contains a battery compartment 686 and battery compartment cover 685. As stated herein, system 100 provides that when fob 600 and a smart wallet 111, 300, 500 of the present invention are outside approximately a predetermined range, fob 600 will provide audible indication via speaker 616, as well as visual indication 620.

Figure 7B:
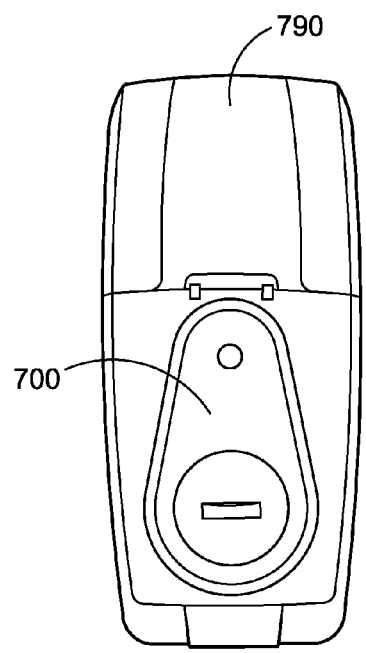
FIG. 7B is a side view of the second fob key embodiment affixed to a cellular phone according to a preferred embodiment of the present invention.

Still further, another fob key embodiment 700 is realized in FIGS. 7A through 7C. As shown, fob 700 comprises sound generator 716, LED 720, as well as battery compartment 786 with cover 785. FIG. 7B illustrates fob 700 affixed to a cellular phone 790 according to the present invention. FIG. 7C shows a perspective view of fob 700 from a vantage point that is underneath the fob 700. Also according to a preferred embodiment, a first side of self-adhesive 787 that mates with fob 700 comprises a relatively high strength bonding material; and a second side of self-adhesive 787 comprises a relatively low strength bonding material. It is yet still further contemplated that the fob key applicable hardware components could be incorporated into existing cellular phones wherein only required software is needed to instruct the fob key to work as such according to the present invention.

As stated, smart wallet 111, 300, 500 is an electronic personal vault that can communicate wirelessly 115 to another small key chain fob device 112 or cellular phone fob 600, 700 to monitor their co-location and alert a user when the two are separated. In a preferred embodiment, electronic fob key 600, 700 has a small sleek design where it can be attached to a cellular handset 690, 790. Further in a preferred embodiment, smart wallet 111, 300, 500 is water-resistant and could be further improved to be a water-tight device. Still further in a preferred embodiment, sensors associated with the biometric input can determine if wallet 111, 300, 500 is forced to an open position without biometric authentication. Therefore, if the wallet is pried open with a screwdriver an alarm will sound via sound generator 201.

Construction materials contemplated by the present invention include titanium for the wallet 111, 300, 500. Further, covers 585, 685, 785 for battery compartments 686, 786 may be comprised of polycarbonate-ABS blend. Also in a preferred embodiment, LEDs 320, 420, 520, 620, 720 are contain of translucent plastic (SAN) styrene-acrylonitrile material for covers thereof.

Additional aspects of the present invention considered herein include a bypass function comprising a pin, for example, to allow access to the wallet 111, 300, 500 if battery power is no longer available. Also, USB port 330 and 430 can be used to set up, program and monitor the system 100 of the invention when coupled to a computer device; and also in this way the system can provide a log of biometric attempts to access the wallet 111, 300, 500.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

While the particular Smart Wallet as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A tracking system comprising:
   a first device comprising;
      an outer body having an open position and a closed position;
      a lock for locking by default the outer body in the closed position to secure the first device;
      a biometric reader providing biometric authentication allowing the first device to transition from the secure position to the open position based upon a valid biometric authentication;
      a first RF unit disposed within the outer body operating according to a predetermined wireless standard supporting communications by other than direct mutual induction; and
      a processor for determining and performing a first action relating to the first device in dependence upon a first predetermined aspect of communications other than loss of signal between the first device and a second device comprising a second RF unit operating according to the predetermined wireless standard; and
   the second device comprising:
      the second RF unit operating according to the predetermined wireless standard; and
      a second processor for determining and performing a second action relating to the second device in dependence upon a second predetermined aspect of communications other than loss of signal between the first device and a second device,
      wherein at least one of the first predetermined aspect and the second predetermined aspect of communications between the first device and the second device relates to at least one of a determination of the distance between the first device and the second device and a received signal strength of the communications other than loss of signal satisfying a threshold between the first device and the second device.

2. The tracking system according to claim 1 further comprising;
   a first transducer disposed within the first device to provide at least one of an audible signal, a visual signal, and a mechanical action; and
   a second transducer disposed within the second device to provide at least one of an audible signal, a visual signal, and a mechanical action.

3. The tracking system according to claim 1 wherein, the first action is at least one of a null action and the generation of at least one of an audible signal, a visual signal, and a mechanical action by a transducer associated with the respective one of the first device and the second device.

4. The tracking system according to claim 1 wherein, the second action is at least one of a null action, providing an indication of a direction of relative motion of the first device relative to the second device, and the generation of at least one of an audible signal, a visual signal, and a mechanical action by a transducer associated with the respective one of the first device and the second device.

5. A device comprising;
   an outer body having an open position and a closed position;
   a lock for locking by default the outer body in the closed position to secure the device;
   a biometric reader providing biometric authentication allowing the device to transition from the secure position to the open position based upon a valid biometric authentication;
   a first RF unit disposed within the outer body operating according to a predetermined wireless standard supporting communications by other than direct mutual induction;
   a transducer; and
   a processor for determining and performing a first action relating to the device in dependence upon a first predetermined aspect of communications other than loss of signal between the device and a second device comprising a second RF unit operating according to the predetermined wireless standard, wherein the first action relates to the transducer,
      wherein at least one of the first predetermined aspect and the second predetermined aspect of communications between the device and the second device relates to at least one of a determination of the distance between the first device and the second device and a received signal strength other than loss of signal of the communications between the device and the second device.

6. The device according to claim 5 wherein, the transducer generates at least one of an audible signal, a visual signal, and a mechanical action.

7. A method for protecting a device comprising:
   providing a second device comprising:
      a first RF unit operating according to a predetermined wireless standard supporting communications by other than direct mutual induction;
      a first transducer;
      a first processor for determining and performing a first action relating to the first transducer in dependence upon a first predetermined aspect of communications other than loss of signal between the device and the second device; and
   providing the device comprises providing;
      an outer body having an open position and a closed position;
      a lock for locking by default the outer body in the closed position to secure the device;
      a biometric reader providing biometric authentication allowing the device to transition from the secure position to the open position based upon a valid biometric authentication; and
      a RF transponder operating according to the predetermined wireless standard,
      wherein the first action comprises determining a direction of the device relative to the second device when the first predetermined aspect of communications other than loss of signal between the device and the second device satisfies a threshold.

8. The method according to claim 7 wherein, providing the RF transponder comprises providing one of a passive RFID device, and active RFID device, and a second RF unit disposed within the outer body of the device operating according to a predetermined wireless standard.

9. The method according to claim 7 wherein, the device further comprises a processor for determining and performing a second action relating to a second transducer in dependence upon a second predetermined aspect of communications other than loss of signal between the device and the second device.

10. The method according to claim 7 wherein, the first transducer generates at least one of an audible signal; a visual signal, and a mechanical action.

11. The method according to claim 9 wherein, the second transducer generates at least one of an audible signal, a visual signal, and a mechanical action.

* * * * *